P. WEBER.
PHONOGRAPH.
APPLICATION FILED JAN. 29, 1908.
932,202.
Patented Aug. 24, 1909.
2 SHEETS—SHEET 1.
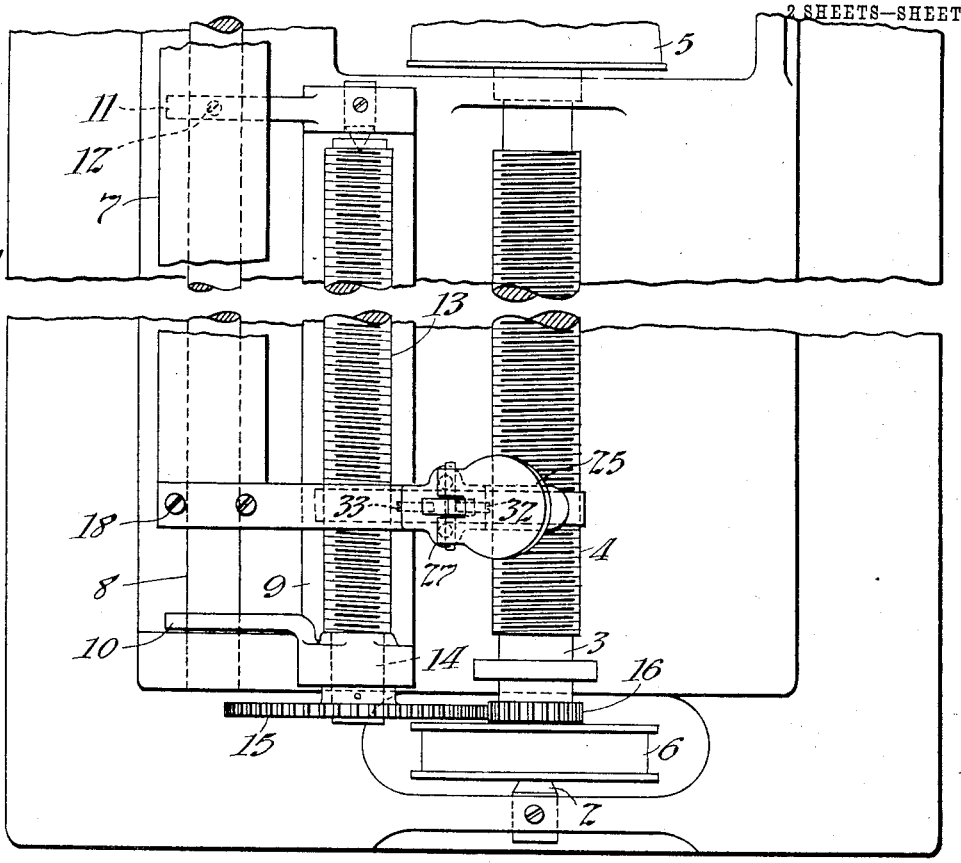
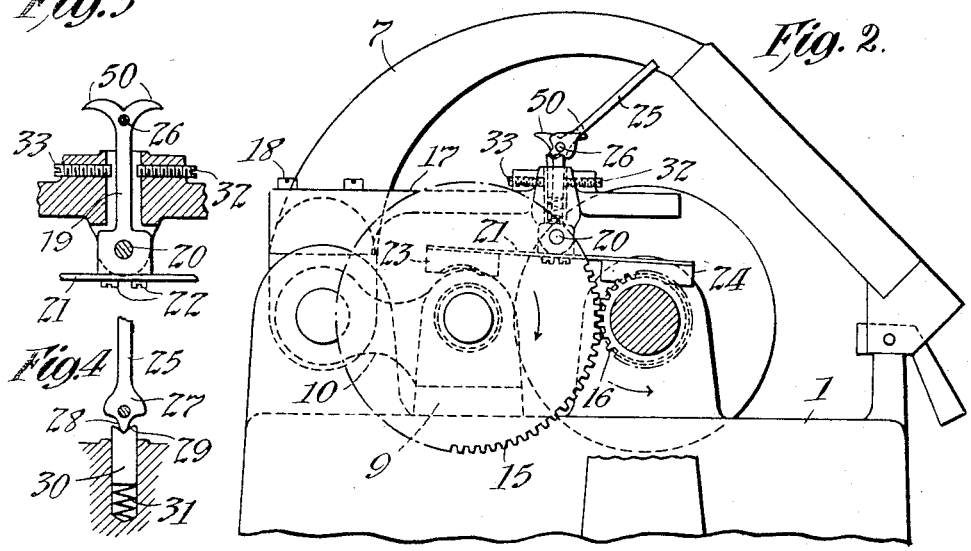
Witnesses:
Frank D. Lewis
Herbert H. Dyke
Inventor:
Peter Weber
by Frank L. Dyer
Atty.

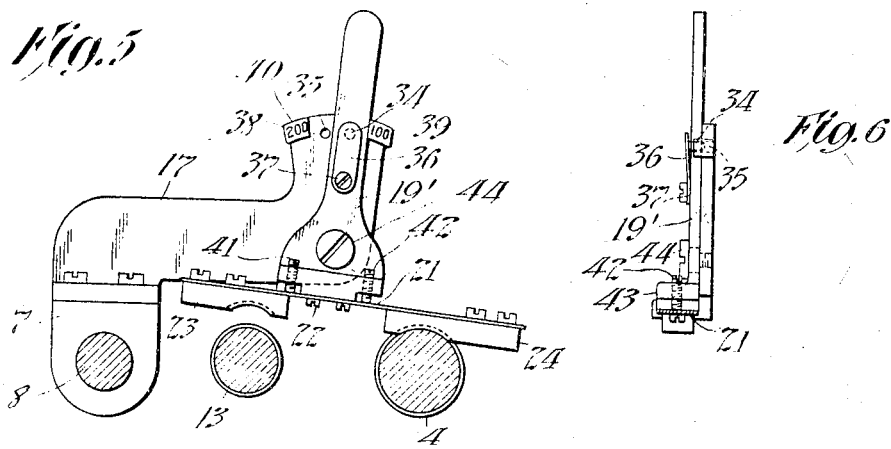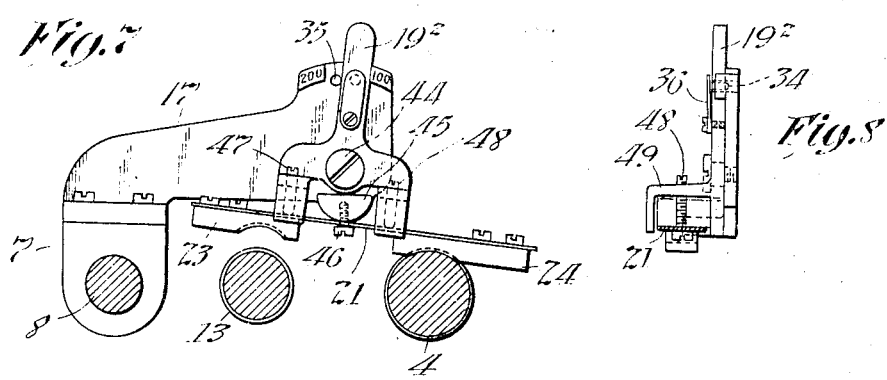

UNITED STATES PATENT OFFICE.

PETER WEBER, OF ORANGE, NEW JERSEY, ASSIGNOR TO NEW JERSEY PATENT COMPANY, OF WEST ORANGE, NEW JERSEY, A CORPORATION OF NEW JERSEY.

PHONOGRAPH.

932,202.

Specification of Letters Patent. Patented Aug. 24, 1909.

Application filed January 29, 1908. Serial No. 413,156.

*To all whom it may concern:*

Be it known that I, PETER WEBER, a citizen of the United States, and a resident of Orange, in the county of Essex and State of New Jersey, have invented certain new and useful Improvements in Phonographs, of which the following is a specification.

My invention relates to phonographs of the type wherein the sound box is carried on a traveling carriage, to which a progressive movement is imparted by means of a rotating feed screw, so that the reproducer or recorder stylus traces a spiral path with respect to the record surface.

It has been the usual practice for many years to provide a feed screw of fine pitch which advances the traveling carriage a distance of one one-hundredth of an inch for each revolution of the mandrel. More recently, however, it has been found possible to manufacture a sound record in which the record groove has two hundred turns or threads to the inch, so that it is desirable to provide a phonograph in which the feed of the carriage will be suitable for operating a record of this description. In view of the fact, however, that there are already thousands of phonographs in use in which the feed screw advances the carriage one one-hundredth of an inch per mandrel revolution, and a vast number of records are also in use having a pitch of one one-hundredth of an inch, it is desirable to provide means which may be readily applied to such phonographs whereby the carriage may be fed at a rate suitable for operating upon records having two hundred threads to the inch, and which will also permit the feeding of the carriage at its usual speed for operating upon records having one hundred threads to the inch, so that the phonograph can be used interchangeably with sound records having either one hundred or two hundred threads to the inch.

My invention has for its object the provision of interchangeable means of this character which comprises an extra or auxiliary feed screw which may be readily applied to the present type of phonograph, and means which may also be readily applied, whereby the sound box carriage may be operatively connected with each of the feed screws and fed at either of the desired speeds, and by which the operative connection of the traveling carriage may be readily shifted from one feed screw to the other, indicating means being preferably provided in connection with the means for shifting the said connection, for indicating the rate at which the carriage is being fed, or, in other words, the type of record with which the phonograph is operative in either of the positions which the said shifting means occupies.

Reference is hereby made to the accompanying drawing, of which—

Figure 1 is a plan view of a portion of a phonograph to which one form of my invention is applied; Fig. 2 is an end view of the same, partly in section; Fig. 3 is a detail side view of a portion of the mechanism for shifting the operative connection of the traveling carriage from one feed screw to the other; Fig. 4 is a similar view showing another detail of said mechanism; Figs. 5 and 6 are side and edge views of a modified form of operating connection between the traveling carriage and the two feed screws, and Figs. 7 and 8 are similar views of another modification.

In all of the views corresponding parts are designated by the same numerals of reference.

The phonograph shown is of well-known form and comprises a base 1, to which is secured a pivot pin or center 2, which rotatably supports the end of the usual main shaft 3 which is provided with a feed screw 4, ordinarily formed with one hundred threads to the inch and which carries the mandrel 5, said shaft 3 being also provided with a drive pulley 6 which receives the belt from the phonograph motor. The traveling carriage 7, which carries the sound box, is sleeved upon a rod 8 rigid with the base 1. An auxiliary frame 9 is provided, which has a pair of rearwardly extending arms 10 and 11, which are sleeved upon the rod 8 and secured thereto in any suitable manner, as by a set screw 12. The auxiliary feed screw 13 is formed upon the shaft 14 which is rotatably mounted in the frame 9, and is provided at one end with a spur gear 15 fixed thereto and in engagement with a similar gear 16 fixed to the shaft 3 or pulley 6. The thread of the screw 13 extends in a direction opposite to that of the thread of the screw 4, since the two screws revolve in opposite directions. The gears 15 and 16 are so proportioned with respect to the thread of the screw 13 that the latter will impart to the traveling carriage a progressive movement suitable for operating upon a record having two hundred threads per inch.

In order that the traveling carriage 7 may be operatively and interchangeably connected with each of the feed screws 4 and 13, an arm 17 is secured at its rear end by screws 18 to the carriage and carries at its forward end a vertical lever 19 pivoted at 20 to the said arm, and a flat spring 21 is secured thereto in any suitable manner, as by screws 22. Said spring carries at its ends the feed nuts 23 and 24, the former being adapted to engage the thread of the screw 13 and the latter the thread of the screw 4, the movement of the lever 19 in a forward direction serving to bring the nut 24 into engagement with the screw 4, at the same time removing the nut 23 from engagement with the screw 13, and vice versa, a rearward movement of the lever 19 removes the nut 24 from engagement with the screw 4 and brings the nut 23 into engagement with the screw 13. Suitable means for operating said lever 19 are preferably provided, and as shown comprise an operating lever 25 which is pivoted at 26 to the upper end of the lever 19, the lever 25 being formed with a pair of arms 27 which embrace the upper end of the lever 19, and receive the pivot pin 26. The lower ends of the arms 27 are shaped as shown in Figs. 2 and 4, forming cam surfaces 28, which engage the curved surfaces 29 formed in the upper ends of vertical pins 30, which occupy vertical recesses formed in the arm 17, said pins 30 being pressed in an upward direction by spiral springs 31 placed in the bottom of said recesses and engaging the lower ends of said pins. The springs 31 tend to throw the lever 25 from a central position toward either the right or left, Fig. 2; that is, when the lever 25 is moved either to the right or left of the vertical line, the pins 30 actuated by the springs 31 throw the lever 25 to either of its extreme positions as determined by the front or rear stops which, as shown, are in the form of screws 32 and 33, which are threaded in the enlarged portion of the arm 17, in such a position as to limit the movement of the vertical lever 19.

The parts are preferably so arranged that the spring 21 will be under a slight stress in either of its operative positions, whereby the feed nuts 23 and 24 will be yieldingly applied to their respective feed screws. The degree of pressure of the feed nuts upon their respective screws may be varied by adjustment of the screws 32 and 33. The movement of the lever 25 beyond the position of Fig. 2 is prevented by its engagement with one of the ears 50 formed on the upper end of the lever 19.

In the device of Figs. 5 and 6, the arm 17 is somewhat altered in shape, and is provided with a vertical lever 19', which is pivoted upon a screw 44 which is threaded in the arm 17. The spring 21, which carries the feed nuts 23 and 24 is rigidly secured to the flange 43 of lever 19' by the screws 22. The lever 19' is adapted to be operated by hand and to be locked in either its forward or rear position by engagement of a locking pin 34 with holes or depressions 35 formed in the arm 17, said pin 34 being secured to the free end of a spring 36 which is secured to the lever 19' by a screw 37. The arm 17 is formed with stops, for limiting the movement of the lever 19' in both directions, in the form of lugs 38 and 39, to which figures 40 may be applied to indicate the number of threads per inch of the phonograph record upon which the phonograph is adapted to operate when the lever 19' is in position adjacent either of said indicia. The various parts are so designed that the weight of the carriage will impart the desired pressure for each of the feed nuts upon its coöperating feed screw, and said pressure may be regulated or adjusted to any desired degree by means of adjusting screws 41 and 42 respectively which are threaded in the laterally extending flange 43 of the lever 19', in such position that the lower end of each of said screws presses against the upper surface of the spring 21.

In the device of Figs. 7 and 8, the spring 21 which carries the feed nuts 23 and 24, is loosely attached to a rounded lug 45, formed integral with the arm 17, by means of a screw 46 threaded in said lug and passing through a hole in said spring, the diameter of which is somewhat greater than that of the screw to permit the spring to move freely thereupon. The operating lever 19² is pivoted upon the screw 44 carried by the arm 17 and said lever is provided with a pair of screws 47 and 48, which are threaded within the angular arms 49 formed integral with the lever 19², and extending laterally therefrom, said screws 47 and 48 being so situated that their lower ends abut against the upper surface of the spring 21, for pressing either of the nuts 23 and 24 into engagement with the feed screws 13 and 4. The screws 47 and 48 are vertically adjustable for imparting the desired degree of pressure to the spring 21 by virtue of the weight of the traveling carriage. The spring 21 is situated between the extremities of the arms 49 and the main body of the lever, so that a lateral shifting of said spring cannot take place. The lever 19² is also provided with a spring 36 having a pin 34 for engaging the openings 35 of the arm 17 for locking the lever in either of its operative positions.

Having now described my invention, what I claim is:

1. In a phonograph, the combination with the rotating mandrel and traveling carriage, of a pair of rotating feed screws and means for interchangeably connecting said traveling carriage with said feed screws, said means comprising pivoted hand lever means movable to one side or the other of the vertical for connecting the carriage to one or the other of said screws, said screws being of such pitch and rotating at such speed as to impart different rates of feed to said carriage, whereby the latter is adapted to operate upon sound records of different pitch, substantially as set forth.

2. In a phonograph, the combination with the rotating mandrel, traveling carriage, and a pair of feed screws adapted to feed the carriage in a forward direction at different rates of speed, of operatively connected means carried by said carriage for connecting the same in driven relation to either of said feed screws said means comprising pivoted vertically arranged hand lever means.

3. An attachment for phonographs comprising a frame 9 adapted to be sleeved upon the guide rod 8 and provided with a feed screw 13 and means for operatively connecting the same with the main shaft 3 of the phonograph, substantially as set forth.

4. An attachment for phonographs consisting of an arm 17 adapted to be secured to the traveling carriage 7 and provided with a movable support carrying a pair of feed nuts, and means for holding said movable support in suitable positions for interchangeably maintaining said feed nuts in operative relation to a pair of feed screws of the phonograph, substantially as set forth.

5. In a phonograph, the combination of the rotating mandrel, traveling carriage and a pair of rotary feed screws, of a support secured to said carriage, a spring, a feed nut carried by each end of the spring, and a lever pivoted to said support, said spring being so secured to said lever that pivoted movement thereof throws one nut into and the other out of engagement with its respective screw, simultaneously, substantially as set forth.

6. In a phonograph, the combination of the traveling carriage and pair of rotary feed screws adapted to feed the carriage in a forward direction at different rates of speed, of a pair of feed nuts carried by the carriage and movable one into and the other out of engagement with their respective feed screws simultaneously, means for so moving said feed nuts and an indicator for designating the rates of feed of the carriage when either of said feed nuts is in engagement with its feed screw, substantially as set forth.

7. In a phonograph, the combination of the traveling carriage, and pair of rotary feed screws, of an arm 17 secured to said carriage, a lever pivoted thereto, and a pair of spring mounted feed nuts secured to said lever, said lever being movable so as to bring either of said feed nuts into and out of engagement with its feed screw, substantially as set forth.

8. In a phonograph, the combination of the traveling carriage, and a pair of rotary feed screws, of an arm secured to said carriage, a lever pivoted thereto, and a pair of spring mounted feed nuts secured to said lever, and lever means for moving said lever so as to bring either of said feed nuts into and out of engagement with its feed screw, substantially as set forth.

9. In a phonograph, the combination of the traveling carriage, and a pair of rotary feed screws, of an arm 17 secured to said carriage, a lever pivoted thereto, and a pair of spring mounted feed nuts secured to said lever, said lever being movable so as to bring either of said feed nuts into and out of engagement with its feed screw, and means for holding said lever in either of its extreme positions, substantially as set forth.

This specification signed and witnessed this 28th day of Jan., 1908.

PETER WEBER.

Witnesses:
FRANK D. LEWIS,
ANNA R. KLEHM.